A. CREASE.

VICE

PATENTED JUL 11 1871

116932

Inventor.
Alexander Crease

Witnesses.

UNITED STATES PATENT OFFICE.

ALEXANDER CREASE, OF CLEVELAND, OHIO.

IMPROVEMENT IN VISES.

Specification forming part of Letters Patent No. 116,932, dated July 11, 1871.

*To all whom it may concern:*

Be it known that I, ALEXANDER CREASE, of Cleveland, in the county of Cuyahoga and State of Ohio, have invented a certain new and Improved Vise; and I do hereby declare that the following is a full, clear, and complete description of the same, reference being had to the accompanying drawing making part of this specification.

Figure 1:
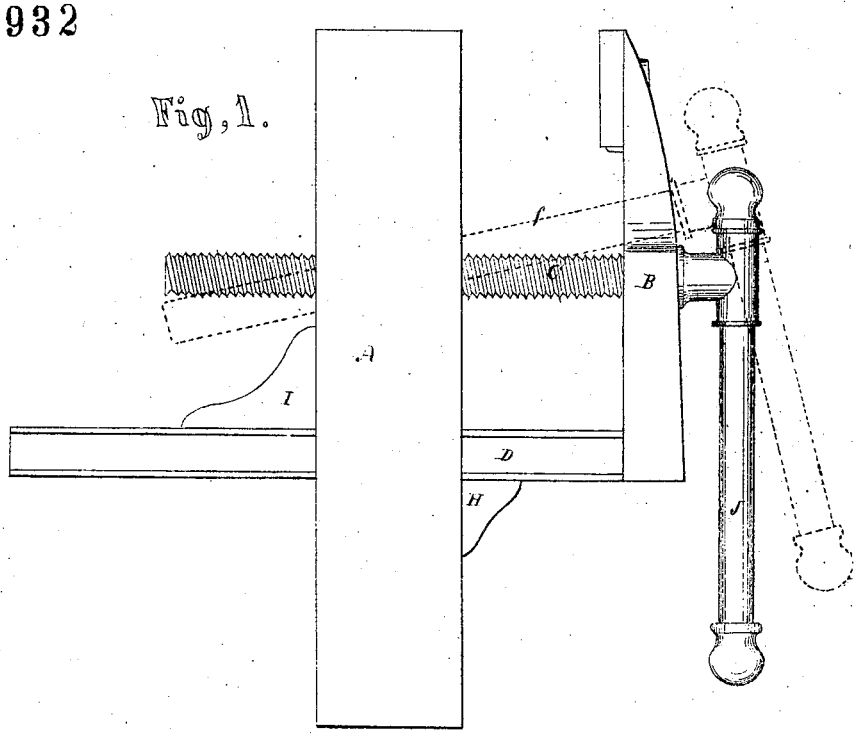
Figure 2:
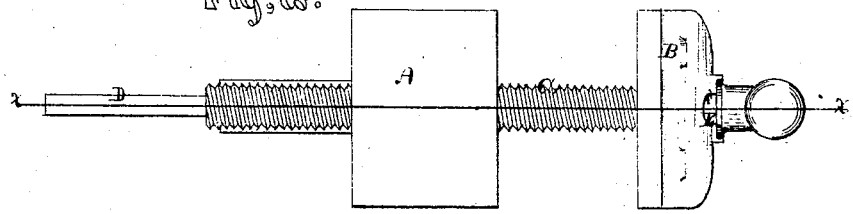
Figure 3:
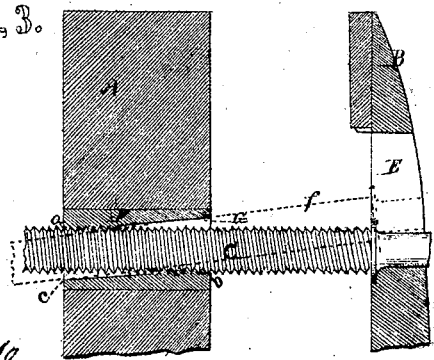

Figure 1 is a side view of the vise. Fig. 2 is a plan view. Fig. 3 is a vertical section in direction of the line x x.

Like letters of reference refer to like parts in the several views.

This invention has for its object certain improvements in a carpenter's vise, as hereinafter set forth and shown.

In the drawing, Fig. 1, A represents the stationary jaw of the vise permanently attached to the bench. B is the movable jaw, which is connected to the jaw A by means of the screw C and guide or slide D. The neck of said screw is secured to the movable jaw in a slot, E, Fig. 3, in which it freely turns, and is also allowed a vertical movement, for a purpose hereinafter shown. F, Fig. 3, is the nut in which the screw C is received and works. It will be observed that the thread in said nut does not run entirely around the inside and lengthwise through it, but that the thread is semi the circumference of the screw or bore of the nut on the upper side of the end, as seen at a, Fig. 3, and which extends back to about one-third the length of the nut, whereas the rest part of the upper side or circumference of the nut is cut away to the depth of the thread near thereto, and increasing in depth outward to the end of the nut, forming a wedge-like space, G, above the screw, and extending around to about one-half of its circumference. The lower half of the nut immediately below the space G is threaded, as seen at b, whereas the lower anterior part of the nut or the thread is removed, forming a space, c, similar to the space G. By this it will be obvious that the nut is provided with two semicircular threads, one of which is above the screw at a, Fig. 3, and the other below the screw at b; hence the screw C is not inclosed by continuous female thread, like that of an ordinary nut, but by two semicircular threads, one at each end of the nut. The slide D referred to is connected to the lower end of the jaw B in a rigid manner, and which passes through the stationary jaw, as shown in Fig. 1. To the side of jaw A is secured a bracket, H, upon the upper surface of which the under side of the slide rests and slides. I is also a bracket secured to the opposite side of said jaw A, and upon the face of which the upper side of the guide slides, the purpose of which will presently be shown.

Having described the construction and arrangement of the vise, the practical working of the same is as follows: In order to work the jaw B for the purpose of clamping any article between it and the stationary jaw, the screw is brought to a horizontal position, as shown in Fig. 1. This position of the screw causes it to engage the semicircular threads in the nut, as shown in Fig. 3. Now, on turning the screw by the handle J, the jaw B will be drawn toward the stationary one, thereby clamping any article that may be placed between it and the jaw A. The lower end of the movable jaw will be held in position by the brackets H I, by which, as the upper end of the jaw is strained backward, the lower end is forced forward, thereby cramping the guide or slide D between the brackets, and thus keeping the jaw B in a vertical position and at any particular point of its length. To draw back the jaw B in an expeditious manner, the head of the screw is lifted, the neck thereof sliding in the slot E for that purpose. This lifting of the screw brings it to the position indicated by the dotted lines f, which will release it from its union with the threads in the nut. When in this position the screw can be readily and quickly drawn through the nut in either direction to any extent that may be required, thereby saving the time that would be required to move the jaw by turning the thread in the ordinary way. On dropping the screw from the position indicated by the dotted lines f, it again engages the threads of the nut and can now be worked by moving the jaw B.

What I claim as my invention, and desire to secure by Letters Patent, is—

1. The brackets H I, as arranged in relation to and in combination with the slide D, in the manner substantially as described, and for the purpose specified.

2. The slotted jaw B, slide D, brackets H I, jaw A, screw C, and nut F, all arranged to operate in the manner as and for the purpose set forth.

ALEXANDER CREASE.

Witnesses:
J. H. BURRIDGE,
D. L. HUMPHREY.